United States Patent [19]

Förg et al.

[11] Patent Number: 5,660,807
[45] Date of Patent: Aug. 26, 1997

[54] PROCESS FOR THE REMOVAL OF HCN FROM GAS MIXTURES

[75] Inventors: Wolfgang Förg, Icking; Gerhard Ranke, Pöcking; Michael Heisel, Pullach; Dietrich Maschmeyer, Marl; Robert Walter, Haltern, all of Germany

[73] Assignees: Linde Aktiengesellschaft, Wiesbaden; Huls Aktiengesellschaft, Marl, both of Germany

[21] Appl. No.: 553,588
[22] PCT Filed: May 20, 1994
[86] PCT No.: PCT/EP94/01646
 § 371 Date: May 13, 1996
 § 102(e) Date: May 13, 1996
[87] PCT Pub. No.: WO94/29004
 PCT Pub. Date: Dec. 22, 1994

[30] Foreign Application Priority Data

Jun. 9, 1993 [DE] Germany ............................ 43 19 234.3

[51] Int. Cl.$^6$ .................................................. B01D 53/42
[52] U.S. Cl. ................... 423/236; 423/244.02; 423/244.1
[58] Field of Search .............................. 423/244.1, 236, 423/244.02; 502/309

[56] References Cited

U.S. PATENT DOCUMENTS

| | | | |
|---|---|---|---|
| 4,399,112 | 8/1983 | Voirin | 423/244.02 |
| 4,668,491 | 5/1987 | Wimmer et al. | 423/244.1 |
| 4,769,224 | 9/1988 | van Grinsven et al. | 423/236 |
| 4,937,058 | 6/1990 | Dupin et al. | 423/244.1 |
| 4,981,661 | 1/1991 | Borsboom | 423/244.1 |
| 5,494,650 | 2/1996 | Kvasnikoff | 423/220 |

FOREIGN PATENT DOCUMENTS

| | | | |
|---|---|---|---|
| 51-156 | 5/1982 | European Pat. Off. | |
| 0 051 156 | 5/1982 | European Pat. Off. | |
| 171001 | 2/1986 | European Pat. Off. | |
| 0 171 001 | 2/1986 | European Pat. Off. | |
| 380140 | 8/1990 | European Pat. Off. | |
| 0 380 184 | 8/1990 | European Pat. Off. | |
| 448298 | 6/1925 | Germany. | |
| 448 298 | 6/1925 | Germany. | |
| 60-232246 | 10/1985 | Japan | 502/309 |
| 61-274729 | 4/1986 | Japan | 423/236 |
| 8 800 525 | 10/1989 | Netherlands. | |
| 8800525 | 10/1989 | Netherlands. | |

*Primary Examiner*—Michael Lewis
*Assistant Examiner*—Peter T. DiMauro
*Attorney, Agent, or Firm*—Millen, White, Zelano, & Branigan, P.C.

[57] ABSTRACT

The invention relates to a process for the removal of HCN from gas mixtures that contain at least HCN and sulfur compounds, especially from gas mixtures that are obtained by partial oxidation of hydrocarbons, by catalytic decomposition of HCN, as well as a catalyst for the decomposition of HCN. According to the invention, the gas mixture is brought into contact with a catalyst which decomposes the HCN by hydrogenation and/or by hydrolysis and COS that is contained in the gas mixture is decomposed at least partially in this catalyst by hydrolysis. Advantageously, a catalyst that is based on titanium oxide and/or zirconium oxide as a vehicle and that contains chromium oxide as an active component is used. Advantageously, the catalyst is reduced during catalyst production or before use with $H_2$ and/or a reducing gas at temperatures above the operating temperature of catalytic decomposition.

15 Claims, No Drawings

PROCESS FOR THE REMOVAL OF HCN FROM GAS MIXTURES

BACKGROUND OF THE INVENTION

The invention relates to a process for the removal of HCN from gas mixtures that contain at least HCN and sulfur compounds, especially from gas mixtures that are obtained by partial oxidation or by gasification of carbon or oil, by catalytic decomposition of HCN, as well as a catalyst for the decomposition of HCN from a gas mixture by hydrogenation and/or hydrolysis.

Numerous hydrocarbon-containing gas mixtures, such as, for example, the gas mixtures that are obtained in the gasification of carbon or oil or other hydrocarbon-containing substances, must be freed of sour gas portions such as $H_2S$ before they are further processed. $H_2S$ removal is usually done, especially in the case of low $H_2S$ contents, by gas scrubbing with a solvent that has a chemical or physical action. Since HCN that is contained in the gas mixture is dissolved by the solvents that are usually used and since HCN is not completely removed from the solvent when the solvent is regenerated, HCN is concentrated in the solvent, and in many cases the solvent is even decomposed by HCN. Therefore, HCN is removed by catalytic decomposition in a way known in the art before sour gas scrubbing.

A process for the removal of HCN in a catalyst that contains the elements nickel, uranium, and thorium in the form of their oxides from a gamma-aluminum-oxide carrier, is known from, for example, DE-OS 22 45 859. DE-AS 27 33 105 describes the catalytic hydrogenation of HCN in a catalyst that contains 10 to 45% by weight of hydrogenation-active metals of the sixth and/or eighth subgroup of the periodic system in the form of oxides and sulfides and 90 to 55% by weight of a carrier. The catalytic hydrogenation zone is operated there at a temperature of 100° to 250° C., and preferably 150° to 230° C.

It is known from EP-B-0 049 394 that the above-mentioned catalysts, on the one hand, bring about the hydrogenation of HCN but that in this case, on the other hand, undesirable secondary reactions occur. Thus, a considerable amount of methyl mercaptan is formed by hydrogenation of COS. At the same time, additional COS is subsequently supplied by the thio-conversion reaction. Moreover, the catalysts support the formation of formic acid from HCN. Methyl mercaptan ($CH_3SH$) and formic acid generally result in disruptions of the sour gas scrubbing slage.

Moreover, catalysts based on $Al_2O_3$ are known as carriers that ensure the desired catalytic reaction of HCN without the above-mentioned undesirable secondary reactions, but only starting at temperatures of about 250° to 300° C. In the case of large amounts of gas, such as occur, for example, in the case of carbon gasification, especially combined cycle turbine power stations (gas and steam-turbine power stations), heating the gas mixture to temperatures of about 250° to 280° C. for HCN decomposition results in enormous costs. At the same time, high heat losses occur if the installation is not supplemented by appropriate, very expensive measures. In addition, acid components such as HF and HCl that are contained in the waste gas decompose in catalysts that are based on $Al_2O_3$.

SUMMARY OF THE INVENTION

The object of the invention is therefore to indicate a process of the type described at the beginning and a catalyst that ensure that the described drawbacks are avoided in the case of HCN decomposition. In particular, the catalyst is to make possible HCN decomposition without undesirable secondary reactions at the lowest possible temperatures.

This object is achieved according to the invention in that the gas mixture is brought into contact with a catalyst that decomposes the HCN by hydrogenation and/or by hydrolysis, and COS that is contained in the gas mixture is decomposed at least partially in this catalyst by hydrolysis.

Since, during sour gas scrubbing, especially with amines as solvents, on the one hand, COS is poorly scrubbed out but, on the other hand, the desulfurization of the gas mixture makes it necessary to remove COS, COS hydrolysis is necessary. The COS hydrolysis is usually carried out in a separate process step by catalytic reaction of the COS in a catalyst that is different from the catalyst for HCN decomposition. The decomposition of HCN and the at least partial hydrolysis of COS in the same catalyst considerably simplifies the approach. In this case, even complete COS decomposition can be achieved with special advantage, and generally at least the bulk of the COS is decomposed.

Surprisingly enough, it has been shown that a catalyst for HCN decomposition that simultaneously supports the hydrolysis of COS prevents the formation of methyl mercaptan by hydrogenation of COS. Moreover, the catalyst in the process according to the invention suppresses the formation of formic acid.

Advantageously, a catalyst that is based on titanium oxide and/or zirconium oxide as a carrier is used. These carriers have proven resistant to the acid components, such as HF and HCl, that are contained in the waste gas.

Special advantages can be achieved with the process according to the invention if the catalyst contains chromium oxide as an active component. The catalysts that are used according to the invention can be produced according to conventional techniques. These techniques include, for example, the production by dry mixing, by deformation and subsequent calcination, by CO-gel formation, by mixed precipitation (for example, for a $TiO_2$-$Cr_2O_3$ catalyst described in DE-AS 24 58 888) or by impregnation of a $TiO_2$ or $ZrO_2$ carrier with an aqueous chromium solution.

The use of such a catalyst provides the special advantage that, on the one hand, HCN is decomposed by hydrogenation or hydrolysis, simultaneously at least a large part of the COS that is contained in the gas mixture is reacted by hydrolysis, and at the same time the new formation of COS from $H_2S$ and $CO_2$ that is contained in the gas mixture is suppressed corresponding to the thio-conversion reaction.

Catalysts with a proportion by weight of chromium (calculated as Cr) of between 3 and 15%, preferably between 4 and 7%, have proven especially suitable.

Catalytic decomposition at temperatures of 130° to 250° C., preferably 140° to 170° C. and at a pressure of 1 to 100 bar, preferably 20 to 40 bar, is especially advantageous.

The catalysts that are used according to the invention are advantageously reduced. The reduction can take place as early as in the catalyst production or before the installation is put into operation or before the catalyst is used for catalytic decomposition. The reduction is necessarily carried out at temperatures (e.g., at about 350° C.) above the operating temperature for catalytic decomposition, which is—as described above—below 250° C. but preferably between 140° and 170° C. For reduction, all known reducing gases can be used, and reduction with $H_2$ is preferred. In the reduction of the catalyst, chromium oxide that is present as $CrO_2$ is converted to chromium oxide in the form of $Cr_2O_3$.

The catalyst according to the invention is advantageously made of 70 to 95%, preferably 80 to 95% of $TiO_2$ and/or $ZrO_2$. The catalyst advantageously contains between 5 and 23%, preferably between 6 and 10% of chromium, calculated as and in the form of $Cr_2O_3$.

In further development of the invention, a catalyst is used whose inner surface area, measured according to the BET process, is 40 to 80 $m^2/g$, preferably 50 to 70 $m^2/g$. The catalyst according to the invention advantageously has a pore volume of 0.2 to 0.35 ml/g. A catalyst according to the invention with a bulk density of between 0.8 and 1.5 kg/l proves especially suitable.

Below, the invention is explained in more detail based on an example:

A crude gas mixture from carbon gasification was cooled to about 150° C. and subjected to water scrubbing to remove soot, metal dust, etc. A gas mixture saturated with water vapor and having a temperature of 120° C. and a volumetric flow of 100 kMol/h was drawn off from the water scrubbing. The gas mixture was heated to 140° C. at a pressure of 38 bar. Then, catalytic reaction of HCN and COS was carried out. The gas mixture that was subject to the reaction had the following composition:

| | |
|---|---|
| $H_2$ | 32.7 mol % |
| $N_2 + Ar$ | 0.5 mol % |
| CO | 46.2 mol % |
| $CO_2$ | 14.6 mol % |
| $H_2S$ | 0.43 mol % |
| COS | 200 ppm |
| HCN | 150 ppm |
| $NH_3$ | 350 ppm |
| $H_2O$ | 5.5 mol % |

In the example, two catalysts with $Cr_2O_3$ as an active component were used and they are described in more detail below were used:

| Catalyst Designation | L 908/1C | L 909/1C |
|---|---|---|
| Carrier | $TiO_2$ | $ZrO_2$ |
| chromium content [% Cr] | 5.2 | 4.8 |
| BET surface area [$m^2/g$] | 70 | 50 |
| pore volume [ml/g] | 0.30 | 0.23 |
| bulk density [kg/l] | 1.00 | 1.45 |
| catalyst particles | extruder line | tablets |
| diameter [mm] | 4 | 4 |
| length [mm] | 4–12 | 4 |

Before use, both catalysts had been reduced in $H_2$ at a temperature of 350° C. The catalyst load was respectively 5000 $Nm^3/h/m^3$ for both catalysts. After the catalytic reaction stage, a gas mixture which contained 1.5 ppm HCN and 3 ppm of COS was drawn off in both cases. After cooling and water condensation, the residual $NH_3$ was scrubbed out in a water scrubbing. Then, $H_2S$ and $CO_2$ were removed from the gas mixture in an amine scrubbing.

We claim:

1. A process for the removal of HCN and COS from a gas mixture containing at least HCN, $H_2O$, $H_2S$ and COS, comprising contacting the gas mixture at a temperature of 130°–170° C. with a catalyst which decomposes the HCN at least partially by hydrogenation and/or by hydrolysis, and COS at least partially by hydrolysis, said catalyst consisting essentially of 70–95% by weight of at least one of titanium oxide and zirconium oxide as a carrier, and 3–15% by weight of chromium in the form of $Cr_2O_3$, and decomposing at least some HCN and hydrolyzing at least some COS, said decomposition being conducted prior to scrubbing to remove $H_2S$ from the gas mixture.

2. A process according to claim 1, wherein $CrO_3$ is reduced with a reducing gas to form said $Cr_2O_3$ during either catalyst production or before said catalytic decomposition of HCN.

3. A process according to claim 2, wherein said catalytic decomposition is conducted at an operating temperature and the reduction of the catalyst is conducted at temperatures above the operating temperature of catalytic decomposition.

4. A process according to claim 2, wherein the reducing gas is hydrogen.

5. A process according to claim 1, wherein the specific surface area of the catalyst, measured according to the BET method, is 40 to 80 $m^2/g$.

6. A process according to claim 1, wherein the pore volume of the catalyst is between 0.20 and 0.35 mL/g.

7. A process according to claim 1, wherein the bulk density of the catalyst is between 0.8 and 1.5 kg/l.

8. A process according to claim 1, wherein the catalyst contains 4 to 7% by weight of chromium.

9. A process according to claim 1, wherein the catalytic decomposition is conducted at a pressure of 20 to 40 bar.

10. A process according to claim 1, wherein the catalyst comprises 80 to 95% by weight of at least one of $TiO_2$ and $ZrO_2$.

11. A process according to claim 1, wherein the catalyst contains between 7 and 10% by weight of chromium in the form of $Cr_2O_3$.

12. A process according to claim 1, wherein the specific surface area of the catalyst, measured according to the BET method, is 50 to 70 $m^2/g$.

13. A process according to claim 1, wherein the gas mixture has been obtained by partial oxidation or gasification of carbon or oil.

14. A process according to claim 1, wherein the carrier is $TiO_2$.

15. A process according to claim 1, wherein the carrier is $ZrO_2$.

* * * * *